UUS009819477B2

United States Patent
Hirsch et al.

(10) Patent No.: US 9,819,477 B2
(45) Date of Patent: Nov. 14, 2017

(54) ALIGN TRANSMISSIONS FOR SBS

(71) Applicant: QUALCOMM Incorporated, San Diego, CA (US)

(72) Inventors: Olaf Josef Hirsch, Sunnyvale, CA (US); Guido Robert Frederiks, Watsonville, CA (US); Zhanfeng Jia, Belmont, CA (US); Youhan Kim, Fremont, CA (US); Yixiang Li, Fremont, CA (US); Ning Zhang, Saratoga, CA (US)

(73) Assignee: QUALCOMM Incorporated, San Diego, CA (US)

( * ) Notice: Subject to any disclaimer, the term of this patent is extended or adjusted under 35 U.S.C. 154(b) by 39 days.

(21) Appl. No.: 14/701,250

(22) Filed: Apr. 30, 2015

(65) Prior Publication Data

US 2016/0323089 A1    Nov. 3, 2016

(51) Int. Cl.
| | | |
|---|---|---|
| *H04L 5/14* | (2006.01) | |
| *H04W 72/04* | (2009.01) | |
| *H04B 1/44* | (2006.01) | |
| *H04W 52/24* | (2009.01) | |
| *H04W 52/52* | (2009.01) | |
| *H04W 72/08* | (2009.01) | |

(52) U.S. Cl.
CPC ............ *H04L 5/1461* (2013.01); *H04B 1/44* (2013.01); *H04W 52/243* (2013.01); *H04W 52/52* (2013.01); *H04W 72/0446* (2013.01); *H04W 72/0473* (2013.01); *H04W 72/082* (2013.01)

(58) Field of Classification Search
None
See application file for complete search history.

(56) References Cited

U.S. PATENT DOCUMENTS

| | | | |
|---|---|---|---|
| 2005/0215284 | A1 | 9/2005 | Su et al. |
| 2014/0003300 | A1 | 1/2014 | Weissman et al. |
| 2014/0328236 | A1 | 11/2014 | Merlin et al. |
| 2015/0043541 | A1 | 2/2015 | Blankenship et al. |
| 2015/0055580 | A1 | 2/2015 | Lim et al. |
| 2015/0065157 | A1 | 3/2015 | Homchaudhuri et al. |
| 2015/0078483 | A1 | 3/2015 | Sun et al. |
| 2015/0110058 | A1* | 4/2015 | Shapira ................ H04B 1/3805 370/329 |
| 2016/0315640 | A1 | 10/2016 | Hirsch et al. |

OTHER PUBLICATIONS

International Search Report and Written Opinion—PCT/US2016/026069—ISA/EPO—Jul. 8, 2016.

* cited by examiner

*Primary Examiner* — Kwang B Yao
*Assistant Examiner* — Adam Duda
(74) *Attorney, Agent, or Firm* — Paradice and Li LLP (57) ABSTRACT

A method and apparatus for concurrent wireless communications on multiple channels of the same frequency band. A wireless device determines when a first transceiver chain of the wireless device is to receive a first data signal. The wireless device then transmits a second data signal via a second transceiver chain of the wireless device based at least in part on the determination. The wireless device further suspends the transmission of the second data signal in response to the determination that the first transceiver chain is to receive the first data signal.

17 Claims, 9 Drawing Sheets

ALIGN TRANSMISSIONS FOR SBS

TECHNICAL FIELD

The present embodiments relate generally to wireless networks, and specifically to transmitting and receiving wireless signals, concurrently, within the same frequency band.

BACKGROUND OF RELATED ART

Modern wireless devices (e.g., Wi-Fi devices) may be configured to operate in a single-band simultaneous (SBS) mode whereby the wireless device is active on multiple channels, concurrently, in the same frequency band (e.g., 2.4 GHz or 5 GHz band). For example, the wireless device may include a first transceiver chain that operates on one wireless channel (e.g., Channel A) and a second transceiver chain that operates on another wireless channel (e.g., Channel B). Accordingly, the first transceiver chain may transmit data signals via Channel A while the second transceiver chain transmits data signals via Channel B, concurrently. Similarly, the first transceiver chain may receive data signals via Channel A while the second transceiver chain receives data signals via Channel B, concurrently.

Challenges may arise when one of the transceiver chains attempts to transmit data signals on one channel while the other transceiver chain is receiving data signals on another channel. For example, if the first transceiver chain transmits an outgoing data signal while the second transceiver chain is receiving an incoming data signal, the transmission of the outgoing data signal may interfere with the reception of the incoming data signal. This phenomenon, commonly known as "self-interference," typically occurs when the first and second transceiver chains are located in relatively close proximity of one another. Due to the close proximity of the transceiver chains, the signal strength of the outgoing data signal may be significantly greater than the signal strength of the incoming data signal (e.g., as viewed by a receive chain of the second transceiver chain). As a result, the second transceiver chain may not only fail to receive incoming data signals that directly overlap with the outgoing data signal, but may also fail to receive incoming data signals that arrive after transmission of the outgoing data signals ends.

SUMMARY

This Summary is provided to introduce in a simplified form a selection of concepts that are further described below in the Detailed Description. This Summary is not intended to identify key features or essential features of the claimed subject matter, nor is it intended to limit the scope of the claimed subject matter.

A method and apparatus for concurrent wireless communications on multiple channels of the same frequency band are disclosed. For an example embodiment, a wireless device determines when a first transceiver chain of the wireless device is to receive a first data signal. The wireless device then transmits a second data signal via a second transceiver chain of the wireless device based at least in part on the determination. The wireless device further suspends the transmission of the second data signal in response to the determination that the first transceiver chain is to receive the first data signal.

To prevent and/or mitigate the effects of self-interference, the second transceiver chain may suspend transmission of the second data signal prior to the first transceiver chain receiving the first data signal. For example, the first data signal may be received on a first wireless channel of a frequency band and the second data signal may be transmitted on a second (e.g., different) wireless channel of the same frequency band. After the second data signal is suspended, the wireless device may subsequently resume transmission of the second data signal via the second transceiver chain after completing reception of the first data signal via the first transceiver chain.

The transmission of the second data signal may be suspended by terminating the second data signal in response to the first transceiver chain initiating reception of the first data signal. For example, depending on the length of a data frame corresponding to the second data signal, one or more protocol data units (PDUs) may be subtracted from, and/or added to, the data frame so that a tail end of the second data signal coincides with a time at which the first transceiver initiates the reception of the first data signal.

The transmission of the second data signal may also be suspended by preventing a transmission of one or more PDUs of the second data signal that overlap with the first data signal. For example, when the first transceiver initiates the reception of the first data signal, the wireless device may adjust a gain of a power amplifier, in the second transceiver chain, used to transmit the second data signal.

The example embodiments allow a wireless communications device to transmit and receive wireless data signals on two or more channels of the same frequency band, concurrently, while mitigating the effects of self-interference. For example, by suspending transmission of the second data signal by the second transceiver when the first transceiver begins to receive the first data signal, the first data signal may remain unaffected by self-interference that would otherwise be caused by concurrent transmission of the second data signal.

BRIEF DESCRIPTION OF THE DRAWINGS

The present embodiments are illustrated by way of example and are not intended to be limited by the figures of the accompanying drawings. Like numbers reference like elements throughout the drawings and specification.

DETAILED DESCRIPTION

The example embodiments are described below in the context of Wi-Fi enabled devices for simplicity only. It is to be understood that the example embodiments are equally applicable to other wireless networks (e.g., cellular networks, pico networks, femto networks, satellite networks), as well as for systems using signals of one or more wired standards or protocols (e.g., Ethernet and/or HomePlug/PLC standards). As used herein, the terms "wireless local area network (WLAN)" and "Wi-Fi" can include communications governed by the IEEE 802.11 standards, Bluetooth®, HiperLAN (a set of wireless standards, comparable to the IEEE 802.11 standards, used primarily in Europe), and other technologies used in wireless communications. Thus, the terms "WLAN" and "Wi-Fi" may be used interchangeably herein. In addition, although described below in terms of an infrastructure WLAN system including one or more APs and a number of STAs, the example embodiments are equally applicable to other WLAN systems including, for example, multiple WLANs, peer-to-peer (or Independent Basic Service Set) systems, Wi-Fi Direct systems, and/or Hotspots. In addition, although described herein in terms of exchanging data frames between wireless devices, the example embodiments may be applied to the exchange of any data unit, packet, and/or frame between wireless devices. Thus, the term "frame" may include any frame, packet, or data unit such as, for example, protocol data units (PDUs), Media Access Control (MAC) protocol data units (MPDUs), and physical layer convergence procedure protocol data units (PPDUs). The term "A-MPDU" may refer to aggregated MPDUs.

In the following description, numerous specific details are set forth such as examples of specific components, circuits, and processes to provide a thorough understanding of the present disclosure. The term "coupled" as used herein means connected directly to or connected through one or more intervening components or circuits. Also, in the following description and for purposes of explanation, specific nomenclature is set forth to provide a thorough understanding of the present embodiments. However, it will be apparent to one skilled in the art that these specific details may not be required to practice the present embodiments. Any of the signals provided over various buses described herein may be time-multiplexed with other signals and provided over one or more common buses. Additionally, the interconnection between circuit elements or software blocks may be shown as buses or as single signal lines. Each of the buses may alternatively be a single signal line, and each of the single signal lines may alternatively be buses, and a single line or bus might represent any one or more of a myriad of physical or logical mechanisms for communication between components. Embodiments of this disclosure are not to be construed as limited to specific examples described herein but rather to include within their scope all embodiments defined by the appended claims.

Figure 1:
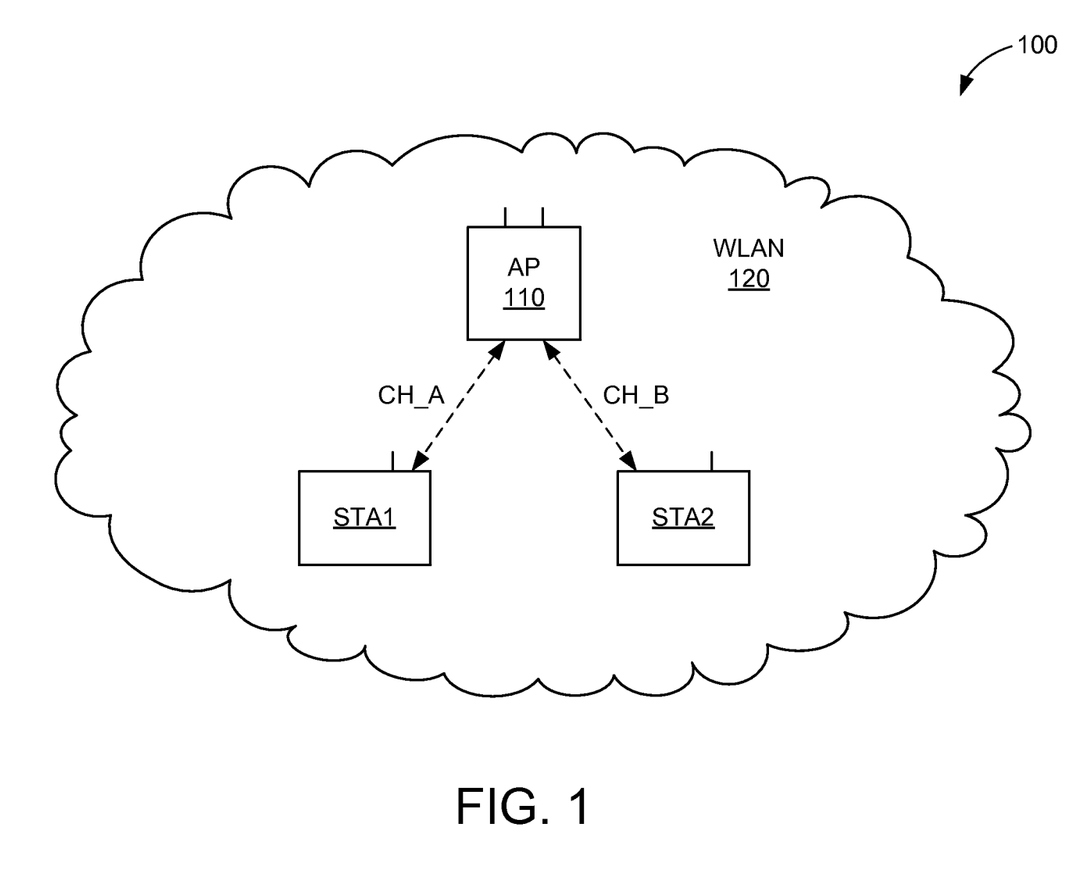
FIG. 1 shows an example wireless system within which the example embodiments may be implemented.

FIG. 1 shows an example wireless system 100 within which the example embodiments may be implemented. The wireless system 100 is shown to include two wireless stations STA1 and STA2, a wireless access point (AP) 110, and a wireless local area network (WLAN) 120. The WLAN 120 may be formed by a plurality of Wi-Fi access points (APs) that may operate according to the IEEE 802.11 family of standards (or according to other suitable wireless protocols). Thus, although only one AP 110 is shown in FIG. 1 for simplicity, it is to be understood that WLAN 120 may be formed by any number of access points such as AP 110. The AP 110 is assigned a unique MAC address that is programmed therein by, for example, the manufacturer of the access point. Similarly, each of STA1 and STA2 is also assigned a unique MAC address.

Each of the stations STA1 and STA2 may be any suitable Wi-Fi enabled wireless device including, for example, a cell phone, personal digital assistant (PDA), tablet device, laptop computer, or the like. Each station (STA) may also be referred to as user equipment (UE), a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. For at least some embodiments, each STA may include one or more transceivers, one or more processing resources (e.g., processors and/or ASICs), one or more memory resources, and a power source (e.g., a battery). The memory resources may include a non-transitory computer-readable medium (e.g., one or more nonvolatile memory elements, such as EPROM, EEPROM, Flash memory, a hard drive, etc.) that store instructions for performing operations described below with respect to FIGS. 7-9.

The one or more transceivers may include Wi-Fi transceivers, Bluetooth® transceivers, cellular transceivers, and/or other suitable radio frequency (RF) transceivers (not shown for simplicity) to transmit and receive wireless communication signals. Each transceiver may communicate with other wireless devices in distinct operating frequency bands and/or using distinct communications protocols. For example, the Wi-Fi transceiver may communicate within a 2.4 GHz frequency band and/or within a 5 GHz frequency band in accordance with the IEEE 802.11 specification. The cellular transceiver may communicate within various RF frequency bands in accordance with a 4G Long Term Evolution (LTE) protocol described by the $3^{rd}$ Generation Partnership Project (3GPP) (e.g., between approximately 700 MHz and approximately 3.9 GHz) and/or in accordance with other cellular protocols (e.g., a Global System for Mobile (GSM) communications protocol). In other embodiments, the transceivers included within stations STA1 and STA2 may be any technically feasible transceiver such as a ZigBee transceiver described by the ZigBee specification, a Wi-Gig transceiver, and/or a HomePlug transceiver described by a specification from the HomePlug Alliance. In example embodiments, two or more transceivers of the same station may communicate within the same frequency band, simultaneously (e.g., with each transceiver operating on a different channel of the frequency band).

The AP 110 may be any suitable device that allows one or more wireless devices to connect to a network (e.g., a local area network (LAN), wide area network (WAN), metropolitan area network (MAN), and/or the Internet) via AP 110 using Wi-Fi, Bluetooth®, or any other suitable wireless communication standards. For at least one embodiment, the AP 110 may include one or more transceivers, a network interface, one or more processing resources, and one or more memory resources. The one or more transceivers may include Wi-Fi transceivers, Bluetooth® transceivers, cellular transceivers, and/or other suitable RF transceivers (not shown for simplicity) to transmit and receive wireless communication signals. Each transceiver may communicate with other wireless devices in distinct operating frequency bands and/or using distinct communication protocols. In example embodiments, two or more transceivers of the AP 110 may communicate within the same frequency band, simultaneously (e.g., with each transceiver operating on a different channel of the frequency band). The memory resources may include a non-transitory computer-readable medium (e.g., one or more nonvolatile memory elements, such as EPROM, EEPROM, Flash memory, a hard drive, etc.) that stores instructions for performing operations described below with respect to FIGS. 7-9.

In example embodiments, the AP 110 may be configured to communicate with both of the stations STA1 and STA2, concurrently, in the same frequency band. This mode of operation may be referred to herein as "single-band simultaneous" (SBS). For example, the AP 110 may include multiple transceivers or transceiver chains (not shown for simplicity) that operate on (e.g., communicate over) different channels of the same frequency band. Thus, for example, one of the transceiver chains may communicate with STA1 over a first wireless channel (CH_A) and another one of the transceiver chains may communicate with STA2 over a second wireless channel (CH_B). Specifically, the AP's transceiver chains may operate on non-overlapping channels of the frequency band. For example, if channel CH_A corresponds to channel 1 of the 2.4 GHz frequency band, then channel CH_B may correspond to any of channels 6-11 of the 2.4 GHz frequency band (e.g., because for the 2.4 GHz frequency band, channels 6-11 do not overlap channel 1).

When operating in SBS mode, the AP 110 may transmit data signals to both of the stations STA1 and STA2, concurrently, with little or no interference between the channels (e.g., especially when the signals are transmitted to STA1 and STA2 on non-overlapping channels). The AP 110 may also receive data signals from both of the stations STA1 and STA2, concurrently, with little or no interference between the channels. However, complications may arise when the AP 110 attempts to transmit a data signal over one channel while concurrently receiving a data signal over the other channel. For example, as perceived by the AP 110, outgoing data signals transmitted by one of its transceiver chains may be much stronger than incoming data signals received by another of its transceiver chains (e.g., which may be weakened due to path loss). As a result, the transceiver chain receiving the incoming data signals may undesirably sample and/or "track" (e.g., by adjusting the phase, frequency, delay, and/or other timing information used in the reception of incoming data signals) at least a portion of the outgoing data signals being transmitted by the other transceiver chain.

For example, the AP 110 may track a channel using pilot tones in each received data symbol. The AP 110 may calculate a frequency offset based on the received data signals and the pilot tones. The AP 110 may also estimate a phase offset corresponding with a change in phase of the received data signals. The AP 110 may then use the phase offset and/or frequency offset to correct the received data tones in one or more tracking loops (e.g., DLLs, PLLs, and/or other components that may track the incoming data signal). However, the calculated phase and/or frequency offsets may be distorted due to self-interference at the AP 110 (e.g., when the AP 110 attempts to transmit and receive data signals concurrently). As a result, the AP 110 may apply incorrect modifications to the received data signals. Moreover, the tracking loops in the AP 110 may enter an incorrect state, thereby causing subsequent PDUs of the incoming data signals to receive improper modifications even after the AP 110 has completed its transmission on the other wireless channel.

In example embodiments, the AP 110 may modify transmit operations on a first transceiver chain when a second transceiver chain receives incoming data signals via the same frequency band on which the first transceiver chain operates. This technique may be referred to herein as "modified transmission." For example, prior to initiating a data transmission via the first transceiver chain, the AP 110 may determine whether a receive (RX) event is scheduled to be performed by the second transceiver chain. An RX event may correspond with a reception of incoming data signals of any type (e.g., including data frames, management frames, and/or control frames). If an RX event is scheduled for the second transceiver chain, the AP 110 may modify the transmission of outgoing data (e.g., via the first transceiver chain) when the second transceiver chain is to receive the incoming data signals, so that the outgoing data does not interfere with the reception of the incoming data signals. For some embodiments, the AP 110 may terminate transmission of the outgoing data signal prior to receiving the incoming data signal. For other embodiments, the AP 110 may adjust the transmit properties of one or more outgoing PDUs that overlap (e.g., in time) with the incoming data signals.

Figure 2:
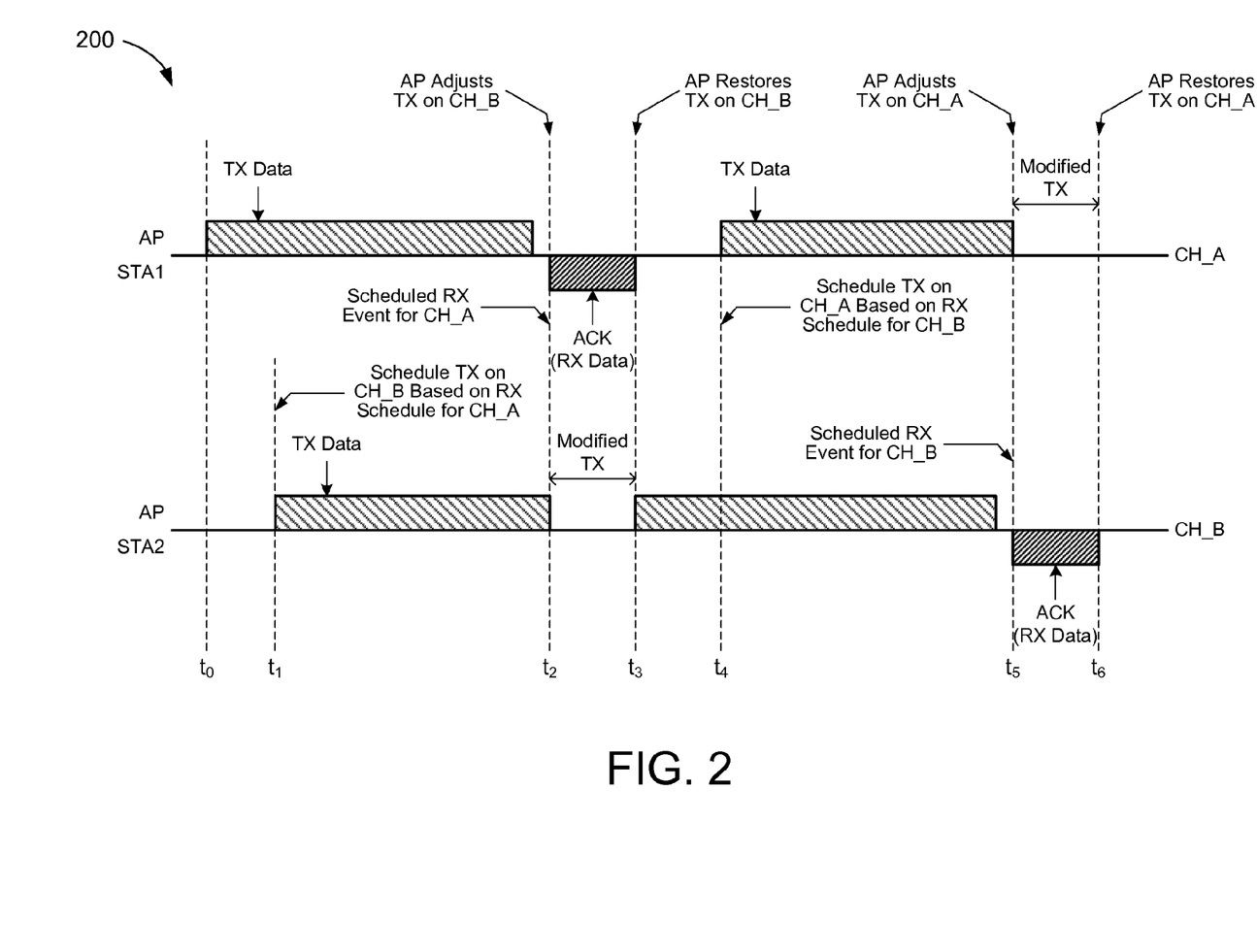
FIG. 2 shows an example timing diagram depicting a single-band simultaneous (SBS) wireless communication with modified transmission (TX) when receiving data signals via the same frequency band.

FIG. 2 shows an example timing diagram 200 depicting an SBS wireless communication with modified transmission (TX) when receiving data signals via the same frequency band. For purposes of discussion herein, the AP and stations STA1-STA2 of FIG. 2 may be AP 110 and stations STA1-STA2, respectively, of FIG. 1. At time $t_0$, the AP 110 is transmitting outgoing (TX) data signals to STA1 (e.g., over wireless channel CH_A). For example, the TX data signals may correspond to a number of data frames that each include a number of individual protocol data units (PDUs) (not shown for simplicity).

At time $t_1$, the AP 110 initiates a transmit (TX) event on channel CH_B. For example, the AP 110 may have buffered data to send to STA2 (e.g., over channel CH_B). In example embodiments, prior to transmitting any data signals over channel CH_B, the AP 110 may first determine whether any receive (RX) events are scheduled on channel CH_A. For example, an RX event may correspond with STA1 sending an acknowledgment (ACK) message back to the AP 110 confirming receipt of the TX data signals transmitted over channel CH_A. The AP 110 may determine if and when an RX event is scheduled to occur on channel CH_A based at least in part on the amount of data remaining to be transmitted to STA1 (e.g., at time $t_1$). For example, outgoing data may be transmitted in data "frames" having predetermined lengths. In the example of FIG. 2, the AP 110 may determine, based on the length of the data frame being transmitted over channel CH_A, that an RX event is scheduled to occur on channel CH_A at time $t_2$.

In example embodiments, the AP 110 may modify transmit operations on channel CH_B when an RX event occurs on channel CH_A. For example, the AP 110 may transmit TX data signals over channel CH_B from time $t_1$ to time $t_2$. When the scheduled RX event is initiated on channel CH_A (e.g., at time $t_2$), the AP 110 may adjust the outgoing data transmissions on channel CH_B. For some embodiments, the AP 110 may schedule a frame of TX data (e.g., to be transmitted on channel CH_B) to terminate at time $t_2$ (e.g., as described in greater detail below with respect to FIGS. 3A and 3B). For other embodiments, the AP 110 may reduce a transmit power of one or more PDUs (e.g., of the TX data signal transmitted on channel CH_B) that overlap with the RX data signals scheduled to be received between times $t_2$ and $t_3$ (e.g., as described in greater detail below with respect to FIG. 4).

By modifying the transmissions of TX data signals on channel CH_B, the RX data signals arriving on channel CH_A may remain unaffected by self-interference that would otherwise be attributable to the concurrent transmission of TX data signals in the same frequency band. At time $t_3$, the AP 110 may restore normal transmit operations on channel CH_B after the RX event is completed on channel CH_A. For some embodiments, the AP 110 may restore normal transmit operations upon detecting that RX data signals are no longer being received on channel CH_A (e.g., at time $t_3$). For other embodiments, the AP 110 may restore normal transmit operations after a predetermined duration allotted for the RX event (e.g., from time $t_2$ to time $t_3$).

At time $t_4$, the AP 110 initiates a subsequent TX event on channel CH_A. For example, the AP 110 may have more queued data for STA1. Prior to transmitting any data signals over channel CH_A, the AP 110 may determine that an RX event is scheduled to occur on channel CH_B at time $t_5$. Thus, the AP 110 may transmit TX data signals over channel CH_A from time $t_4$ to time $t_5$, while modifying transmit operations on channel CH_A when the RX event occurs on channel CH_B (e.g., at time $t_5$). For example, the AP 110 may ensure that the no TX data signals are being transmitted on channel CH_A, and/or interfering with the reception of RX data signals on channel CH_B, for the duration of the RX event (e.g., from time $t_5$ to time $t_6$).

In the example embodiments, SBS communications are performed by the AP 110 with respect to multiple STAs. However, in other embodiments, any of the stations STA1 and/or STA2 may be operable in an SBS mode, whereby the STA may communicate with multiple APs and/or other STAs, simultaneously, within the same frequency band. Still further, for some embodiments, a wireless device (e.g., an AP or a STA) may be enabled for SBS communications with just one other wireless device. For example, when operating in an SBS mode, two wireless devices may be enabled for full duplex communications with one another (e.g., for peer-to-peer communications).

Figure 3A:
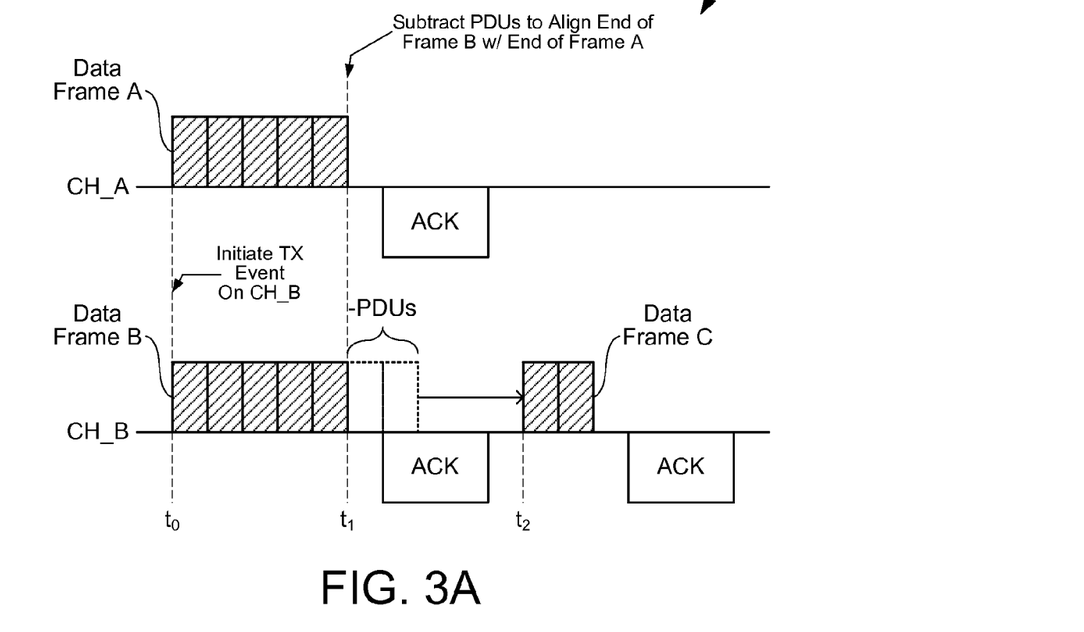
FIGS. 3A and 3B show example timing diagrams depicting methods of terminating an outgoing data signal when an incoming data signal is received via the same frequency band.
Figure 3B:
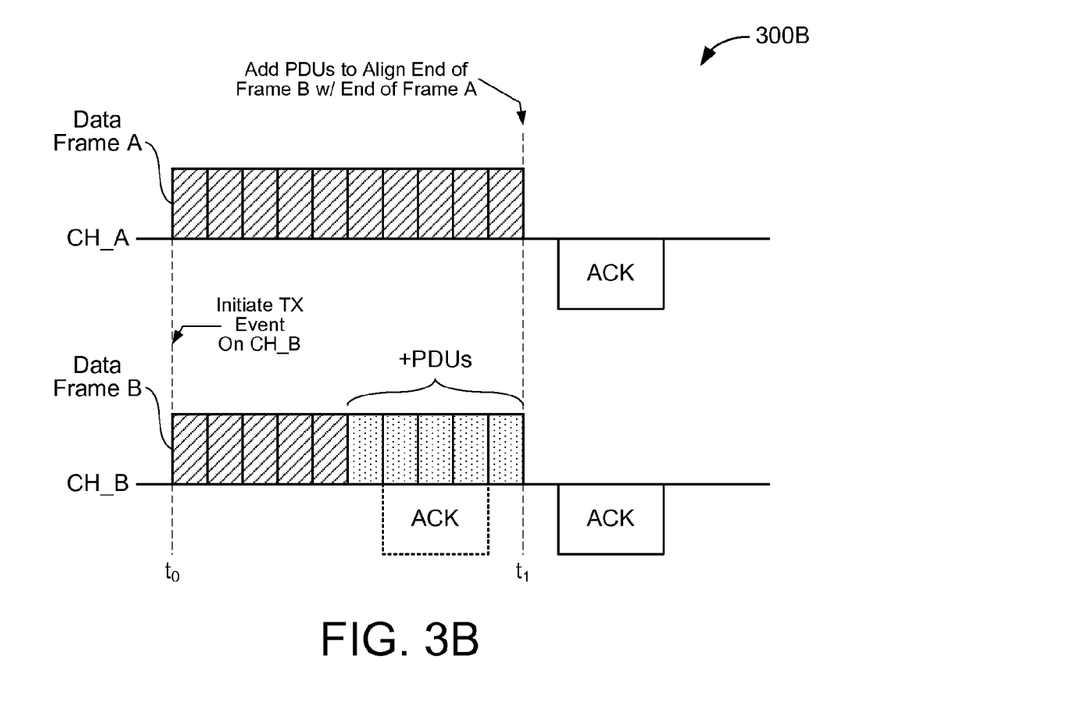

FIGS. 3A and 3B show example timing diagrams 300A and 300B, respectively, depicting methods of terminating an outgoing data signal when an incoming data signal is received via the same frequency band. For consistency, the example embodiments depicted in FIGS. 3A and 3B are described herein as being performed by the AP 110 of FIG. 1. However, the example embodiments may also be performed by any of the stations STA1 and/or STA2 of FIG. 1.

With reference to FIG. 3A, the AP 110 initiates a TX event on channel CH_B at time $t_0$. The TX event may correspond with buffered data (e.g., comprising 7 PDUs) awaiting transmission to STA2. Upon initiating the TX event, the AP 110 may detect that a frame of data (e.g., data frame A) is already being transmitted on channel CH_A (e.g., to STA1). The AP 110 may further determine that the transmission of data frame A is scheduled to terminate at time $t_1$, and that an ACK message is expected (e.g., scheduled) to be received on channel CH_A thereafter (e.g., between time $t_1$ and time $t_2$). Specifically, at time $t_0$, there are still 5 PDUs of data frame A remaining to be transmitted on channel CH_A, whereas 7 PDUs are awaiting transmission on channel CH_B. Transmitting all 7 PDUs on channel CH_B in a single data frame (e.g., data frame B) may cause problems in receiving the subsequent ACK message on channel CH_A (e.g. due to self-interference caused by the concurrent transmission of outgoing data on channel CH_B).

In example embodiments, the AP 110 may shorten the transmission of outgoing data on channel CH_B so that data transmissions on channel CH_B terminate just prior to receiving the ACK message on channel CH_A. For example, the AP 110 may subtract 2 PDUs scheduled to be transmitted with data frame B so that the end of data frame B coincides and/or is aligned with the end of data frame A. Accordingly, both data frame A and data frame B may be configured to terminate at substantially the same time (e.g., time $t_1$). This further allows the AP 110 may receive respective ACK messages on channels CH_A and CH_B (e.g., in response to data frame A and data frame B), concurrently. The remaining (e.g., un-transmitted) 2 PDUs may subsequently be transmitted, on channel CH_B, as a separate data frame (e.g., data frame C) at time $t_2$. For example, the AP 110 may receive a second ACK message on channel CH_B (e.g., in response to data frame C) confirming receipt of the remaining PDUs.

With reference to FIG. 3B, the AP 110 initiates a TX event on channel CH_B at time $t_0$. The TX event may correspond with buffered data (e.g., comprising 5 PDUs) awaiting transmission to STA2. Upon initiating the TX event, the AP 110 may detect that a frame of data (e.g., data frame A) is already being transmitted on channel CH_B (e.g., to STA1). The AP 110 may further determine that the transmission of data frame A is scheduled to terminate at time $t_1$, and that an ACK message is expected to be received on channel CH_B thereafter. Specifically, at time $t_0$, there are still 10 PDUs of data frame A remaining to be transmitted on channel CH_A, whereas only 5 PDUs are awaiting transmission on channel CH_B. Transmitting only the 5 PDUs on channel CH_B (e.g., in data frame B) may cause problems in receiving a subsequent ACK message on channel CH_B (e.g., due to self-interference caused by the concurrent transmission of outgoing data on channel CH_A).

In example embodiments, the AP 110 may extend the transmission of outgoing data on channel CH_B so that data transmissions on channel CH_B terminate just prior to receiving the ACK message on channel CH_A. For example, the AP 110 may add 5 additional PDUs to data frame B so that the end of data frame B coincides and/or is aligned with the end of data frame A. For some embodiments, the AP 110 may generate null PDUs (e.g., PDUs that do not contain any actual buffered data) to be added to data frame B. For other embodiments, the additional PDUs may be pulled into data frame B from other data scheduled to be transmitted on channel CH_B at a later time (e.g., in a subsequent data frame). Accordingly, both data frame A and data frame B may be configured to terminate at substantially the same time (e.g., at time $t_1$). This further allows the AP 110 to receive respective ACK messages on channels CH_A and CH_B (e.g., in response to data frame A and data frame B), concurrently.

Figure 4A:
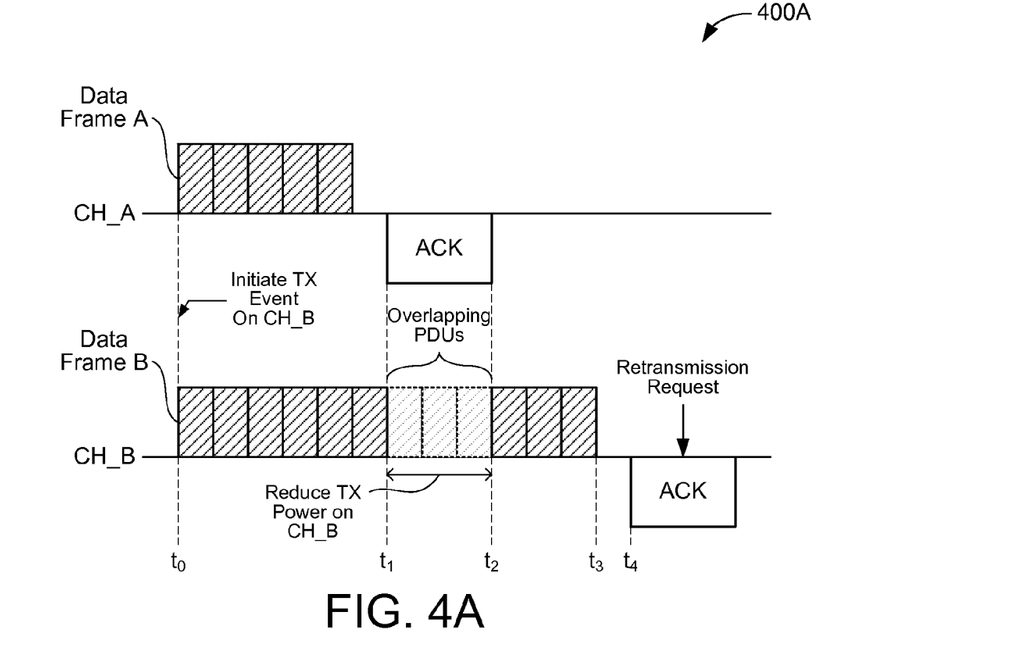
FIGS. 4A and 4B show example timing diagrams depicting methods of adjusting the transmission of outgoing PDUs that overlap with an incoming data signal received via the same frequency band.
Figure 4B:
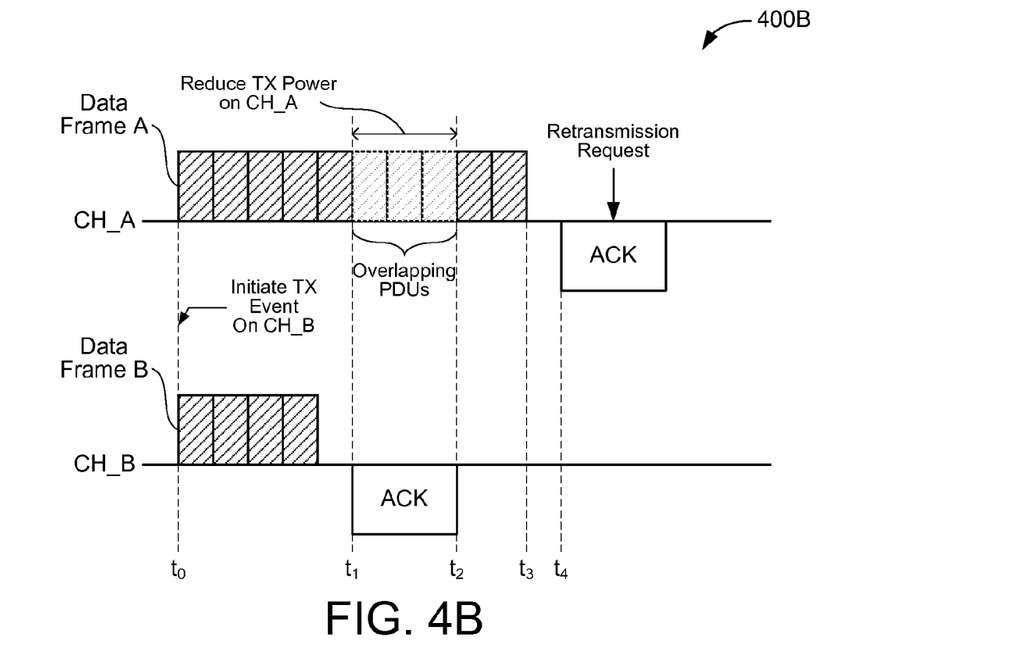

FIGS. 4A and 4B show example timing diagrams 400A and 400B, respectively, depicting methods of adjusting the transmit properties of outgoing PDUs that overlap with an incoming data signal received via the same frequency band. For consistency, the example embodiments depicted in FIG. 4 are described herein as being performed by the AP 110 of FIG. 1. However, the example embodiments may also be performed by any of the stations STA1 and/or STA2 of FIG. 1.

With reference to FIG. 4A, the AP 110 initiates a TX event on channel CH_B at time $t_0$. The TX event may correspond with buffered data (e.g., comprising 12 PDUs) awaiting transmission to STA2. Upon initiating the TX event, the AP 110 may detect that a frame of data (e.g., data frame A) is already being transmitted on channel CH_A (e.g., to STA1).

The AP 110 may further determine that an ACK message is expected to be received on channel CH_A (e.g., in response to data frame A) between time $t_1$ and time $t_2$. Specifically, at time t0, there are still 5 PDUs of data frame A remaining to be transmitted on channel CH_A, whereas 12 PDUs (e.g., corresponding with data frame B) are awaiting transmission on channel CH_B. Transmitting data frame B concurrently with data frame A, at time t0, may result in overlapping PDUs being transmitted on channel CH_B when an ACK message is received on channel CH_A (e.g., between times $t_1$ and $t_2$).

In example embodiments, the AP 110 may prevent the transmission, and/or reduce a transmit power, of overlapping PDUs on channel CH_B (e.g., the PDUs that are scheduled to be transmitted between times $t_1$ and $t_2$). For example, the AP 110 may reduce the transmit power of the transceiver chain operating on channel CH_B from time $t_1$ to time $t_2$. The transmit power may be reduced below a predetermined threshold (e.g., corresponding with a signal strength of the received ACK message on channel CH_A) and/or reduced to zero. Accordingly, STA2 may expect to receive data signals over channel CH_B until the end of data frame B, at time $t_3$. However, STA2 may not receive the overlapping PDUs during the initial transmission of data frame B (e.g., from time $t_0$ to time $t_3$). The "missing" PDUs from data frame B may be perceived as lost due to noise, path loss, and/or other sources of interference in the wireless medium. Thus, STA2 may request retransmission of the missing PDUs of data frame B in the ACK message sent to the AP 110 at time $t_4$ (e.g., in response to data frame B).

With reference to FIG. 4B, the AP 110 initiates a TX event on channel CH_B at time $t_0$. The TX event may correspond with buffered data (e.g., comprising 4 PDUs) awaiting transmission to STA2. Upon initiating the TX event, the AP 110 may detect that a frame of data (e.g., data frame A) is already being transmitted on channel CH_A (e.g., to STA1). The AP 110 may further determine that the transmission of data frame A is scheduled to terminate at time $t_3$. Specifically, at time $t_0$, there are still 10 PDUs of data frame A remaining to be transmitted on channel CH_A, whereas only 4 PDUs (e.g., corresponding with data frame B) are awaiting transmission on channel CH_B. Transmitting data frame B concurrently with data frame A, at time $t_0$, may result in overlapping PDUs being transmitted on channel CH_A when an ACK message is received on channel CH_B (e.g., between times $t_1$ and $t_2$).

In example embodiments, the AP 110 may prevent the transmission, and/or reduce a transmit power, of overlapping PDUs on channel CH_A (e.g., the PDUs that are scheduled to be transmitted between times $t_1$ and $t_2$). For example, the AP 110 may reduce the transmit power of the transceiver chain operating on channel CH_A from time $t_1$ to time $t_2$. As described above, with reference to FIG. 4A, the transmit power may be reduced below a predetermined threshold and/or reduced to zero. Accordingly, STA1 may expect to receive data signals over channel CH_A until the end of data frame A, at time $t_3$. However, STA1 may not receive the overlapping PDUs during the initial transmission of data frame A (e.g., from time $t_0$ to time $t_3$). As described above, STA1 may subsequently request retransmission of the missing PDUs of data frame A in the ACK message sent to the AP 110 at time $t_4$ (e.g., in response to data frame A).

Figure 5:
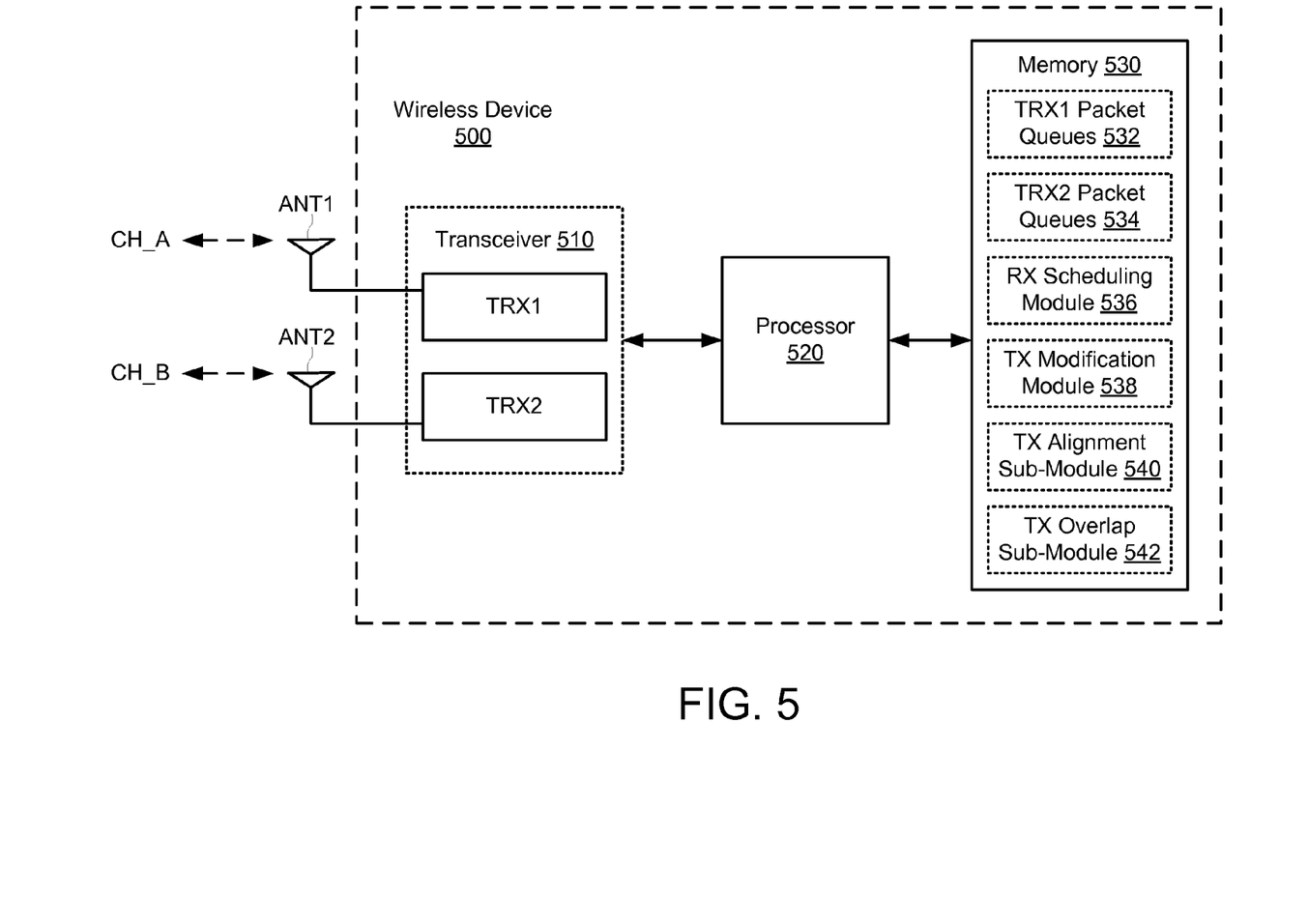
FIG. 5 shows a wireless device in accordance with example embodiments.

FIG. 5 shows a wireless device 500 in accordance with example embodiments. The wireless device 500 may be one embodiment of the AP 110 and/or any of the stations STA1-STA2 of FIG. 1. The wireless device 500 includes at least a transceiver 510, a processor 520, a memory 530, a first antenna ANT1, and a second antenna ANT2. The transceiver 510 may be coupled to antennas ANT1-ANT2 either directly or through an antenna selection circuit (not shown for simplicity). The transceiver 510 may be used to transmit signals to and receive signals from access points, STAs, and/or other suitable wireless devices. The transceiver 510 may also be used to scan the surrounding environment to detect and identify nearby access points and/or STAs.

For the example embodiment of FIG. 5, the transceiver 510 is shown to include two transceiver chains TRX1 and TRX2 that may be used to communicate wirelessly with other suitable wireless devices (e.g., including wireless access points and/or wireless stations). Although not shown in FIG. 5 for simplicity, the first transceiver chain TRX1 may include a first transmit chain to process and transmit signals to another wireless device via antenna ANT1, and may include a first receive chain to process signals received from via antenna ANT1. Similarly, the second transceiver chain TRX2 may include a second transmit chain to process and transmit signals to another wireless device via antenna ANT2, and may include a second receive chain to process signals received via antenna ANT2. In example embodiments, each of the transceiver chains TRX1 and TRX2 may be configured to operate on a different channel of a given frequency band (e.g., in SBS mode). For example, the transceiver chains TRX1 and TRX2 may be configured to transmit and/or receive data signals over respective channels CH_A and CH_B of the same frequency band.

Transceiver 510 is depicted in FIG. 5 as including only two transceiver chains TRX1 and TRX2 and two antennas ANT1-ANT2 for simplicity only; for other embodiments, transceiver 510 may include any suitable number of transceiver chains TRX that may be coupled to any suitable number of antennas. Thus, for at least some embodiments, the wireless device 500 may be configured for multiple-input, multiple-output (MIMO) operations. The MIMO operations may include single-user MIMO (SU-MIMO) operations and multi-user MIMO (MU-MIMO) operations.

Processor 520, which is coupled to transceiver 510 and memory 530, may be any suitable one or more processors capable of executing scripts or instructions of one or more software programs stored in the wireless device 500 (e.g., within memory 530). For purposes of discussion herein, processor 520 is shown in FIG. 5 as being coupled between transceiver 510 and memory 530. For actual embodiments, transceiver 510, processor 520, and/or memory 530 may be connected together using one or more buses (not shown for simplicity).

Memory 530 may include TRX1 packet queues 532 and TRX2 packet queues 534. The TRX1 packet queues 532 may store data packets and/or frames to be transmitted from the wireless device 500, via channel CH_A, to one or more receiving devices. The TRX2 packet queues 534 may store data packets and/or frames to be transmitted from the wireless device 500, via channel CH_B, to one or more receiving devices.

Memory 530 may also include a non-transitory computer-readable medium (e.g., one or more non-volatile memory elements, such as EPROM, EEPROM, Flash memory, a hard drive, etc.) that may store the following software modules:
  a receive (RX) scheduling module 536 to detect and/or monitor for RX events scheduled to be performed by one or more TRX chains of the transceiver 510 when operating in SBS mode;

a transmit (TX) modification module 538 to modify transmit operations on the TRX chains of the transceiver 510 during a scheduled RX event;

a TX alignment sub-module 540 to configure and/or adjust the lengths of outgoing data frames awaiting transmission via a particular TRX chain such that a corresponding data signal transmitted via that TRX chain terminates prior to initiation of a scheduled RX event on another TRX chain; and a TX overlap sub-module 542 to prevent a transmission and/or reduce a transmit power of one or more outgoing PDUs of a data signal being transmitted via a particular TRX chain that overlap with a scheduled RX event on another TRX chain.

Each software module includes instructions that, when executed by processor 520, causes the wireless device 500 to perform the corresponding functions. The non-transitory computer-readable medium of memory 530 thus includes instructions for performing all or a portion of the operations described below with respect to FIGS. 7-9.

For example, processor 520 may execute the RX scheduling module 536 to detect and/or monitor for RX events scheduled to be performed by one or more TRX chains of the transceiver 510 when operating in SBS mode. Processor 520 may also execute the TX modification module 538 to modify transmit operations on the TRX chains of the transceiver 510 during a scheduled RX event. Further, processor 520 may execute the TX alignment sub-module 540 to configure and/or adjust the lengths of outgoing data frames awaiting transmission via a particular TRX chain such that a corresponding data signal transmitted via that TRX chain terminates prior to initiation of a scheduled RX event on another TRX chain. Still further, processor 520 may execute the TX overlap sub-module 542 to prevent a transmission and/or reduce a transmit power of one or more outgoing PDUs of a data signal being transmitted via a particular TRX chain that overlaps with a scheduled RX event on another TRX chain.

Figure 6:
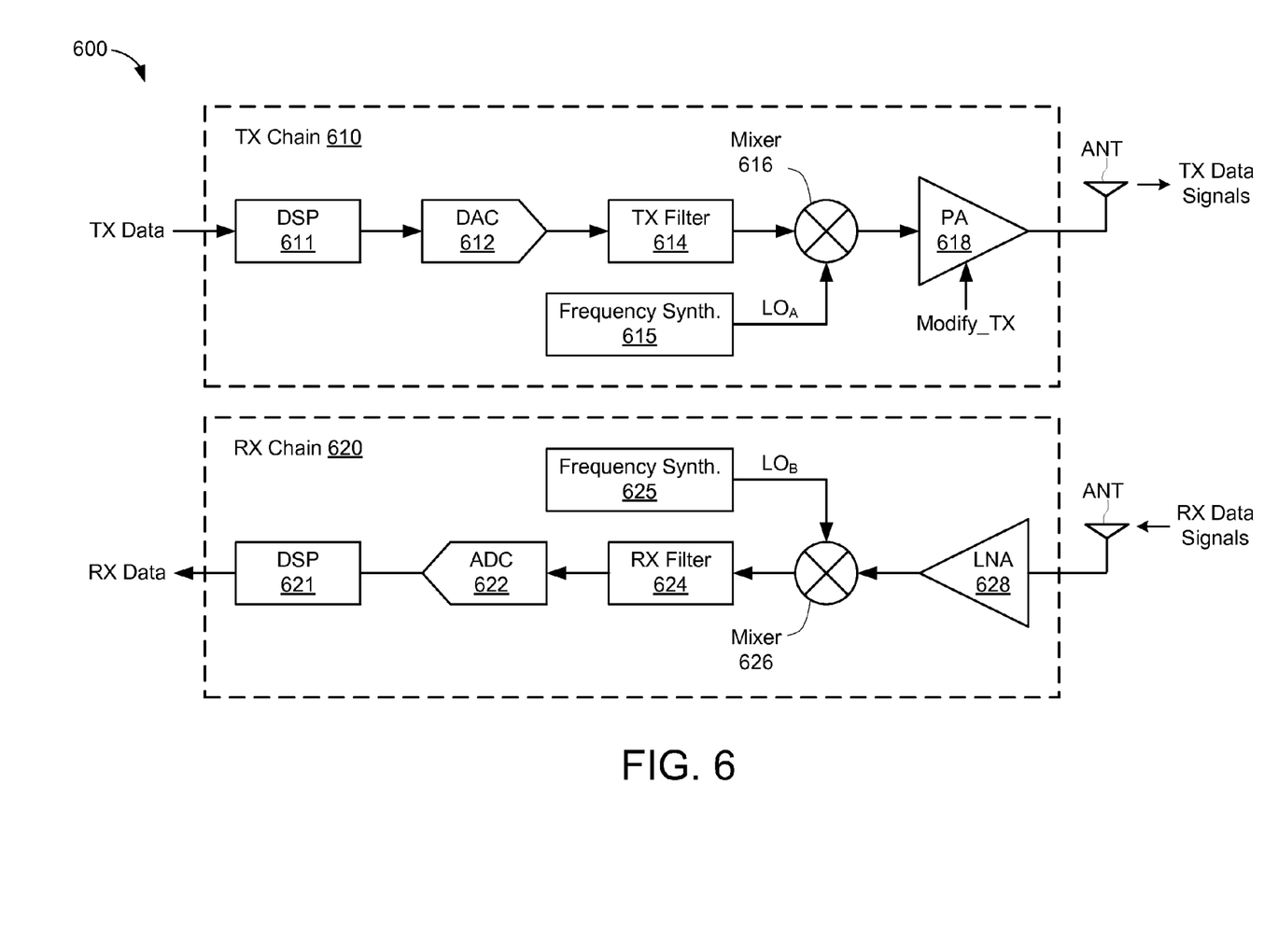
FIG. 6 shows an example transceiver (TRX) circuit that may be operable for SBS wireless communications.

FIG. 6 shows an example transceiver (TRX) circuit 600 that may be operable for SBS wireless communications. The TRX circuit 600 may be implemented by a wireless device (e.g., such as the AP 110 and/or stations STA1 and STA2 of FIG. 1) to transmit and receive data signals over a wireless medium. For example, the TRX circuit 600 may be one embodiment of the transceiver 510 of FIG. 5. The TRX circuit 600 includes a transmit (TX) chain 610 and a receive (RX) chain 620.

The TX chain 610 may include a digital signal processing (DSP) circuit 611, a digital-to-analog converter (DAC) 612, a TX filter 614, a frequency synthesizer 615, a mixer 616, and a power amplifier (PA) 618. The TX circuitry 611-618 may be used for transmitting outgoing (TX) data signals to another device (not shown). For example, the DSP circuit 611 may convert a set of TX data to a digital data stream. The DAC 612 may convert the digital data stream to an analog data signal, which is filtered by the TX filter 614. The filtered analog data signal is then up-converted to a carrier frequency by the mixer 616, for example, by mixing the analog data signal with a local oscillator signal ($LO_A$) generated by the frequency synthesizer 615. The up-converted analog signal is amplified by the PA 618 and subsequently transmitted onto the wireless medium via antenna ANT as a TX data signal.

The RX chain 620 may include a DSP circuit 621, an analog-to-digital converter (ADC) 622, an RX filter 624, a frequency synthesizer 625, a mixer 626, and a low-noise amplifier (LNA) 628. The RX circuitry 621-628 may be used for receiving incoming (RX) data signals transmitted by another device (not shown). For example, the LNA 628 amplifies a signal (e.g., RX data signal) received by antenna ANT, and forwards the received signal to the mixer 626. The mixer 626 down-converts the RX data signal, for example, by mixing the RX data signal with a local oscillator signal ($LO_B$) generated by the frequency synthesizer 625. The data signal may be filtered by the RX filter 624 and converted to a digital data stream via the ADC 622. The digital data stream may then be processed by the DSP circuit 621 to recover a set of RX data.

Although the DSP circuits 611 and 621 are depicted in the example implementation of FIG. 6 as being included within TX chain 610 and RX chain 620, respectively, for other implementations, the DSP circuits 611 and 621 may be separate from the transceiver circuit 600. Further, for at least some implementations, the DSP circuits 611 and 621 may correspond to a baseband processor (not shown for simplicity) of the wireless device 500 of FIG. 5.

In example embodiments, the TRX circuit 600 may be configured to operate in SBS mode. For example, the TX chain 610 may belong to a first transceiver chain (e.g., TRX1 of FIG. 5) operating on a first wireless channel (e.g., channel CH_A), and the RX chain 620 may belong to a second transceiver chain (e.g., TRX2 of FIG. 5) operating, concurrently, on a second wireless channel (e.g., channel CH_B) within the same frequency band as the first wireless channel. Alternatively, and/or additionally, when operating in SBS mode, a third TRX chain (not shown for simplicity) may operate on a third wireless channel (e.g., channel CH_C) of the same frequency band as TRX1 and TRX2.

To prevent transmission of the TX data signals from interfering with reception of the RX data signals, the TRX circuit 600 may modify transmit operations performed by the TX chain 610 when a receive operation is performed (e.g., concurrently) on the RX chain 620. In example embodiments, a processor or controller (not shown for simplicity) within the wireless device and/or within the TRX circuit 600 may monitor RX events scheduled to be performed by the RX chain 620. More specifically, the controller may determine when the RX chain 620 is scheduled to finish transmitting a frame of data (e.g., indicating that an RX event, corresponding to the reception of an ACK message, is expected to follow thereafter), and may assert a Modify_TX signal upon initiation of the RX event. The Modify_TX signal may be used to reduce a transmit power of the PA 618 and/or prevent the PA 618 from transmitting TX data signals altogether.

In other embodiments, the controller may selectively determine the amount of TX data to provide to the TX chain 610 based at least in part on the schedule of RX events to be performed on the RX chain 620. For example, the controller may increase or decrease the amount of buffered data to be supplied to the TX chain 610, at any given time, to ensure that any outgoing data transmissions by the TX chain 610 are terminated at or before the time at which the RX chain 620 is scheduled to receive the RX data signals.

Figure 7:
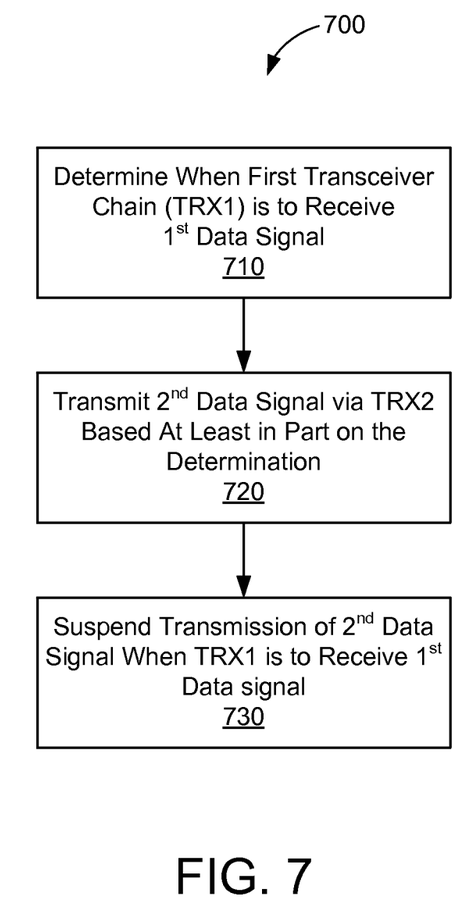
FIG. 7 shows a flowchart depicting a modified TX operation when receiving incoming data during SBS wireless communications, in accordance with example embodiments.

FIG. 7 shows a flowchart depicting a modified TX operation 700 when receiving incoming data during SBS wireless communications, in accordance with example embodiments. With reference, for example, to FIG. 5, the example operation 700 may be performed by the wireless device 500 to modify a transmission of outgoing data signals by the transceiver chains (e.g., TRX1 and/or TRX2) of the transceiver 510 when at least one other transceiver chain is scheduled to receive incoming data signals via the same frequency band. In example embodiments, the modified TX operation 700 may be triggered each time the wireless device 500 has buffered data to send via at least one of the transceiver chains TRX1 and/or TRX2 (e.g., and prior to transmitting the buffered data).

The wireless device 500 determines when the first transceiver chain TRX1 is to receive a first data signal (710). The first data signal may be received over a particular wireless channel (e.g., CH_A). As described above, the transceiver chains TRX1 and TRX2 may operate on separate wireless channels CH_A and CH_B, respectively. The processor 520 may execute the RX scheduling module 536 to monitor for RX events scheduled to be performed by the first transceiver chain TRX1. For some embodiments, the processor 520, in executing the RX scheduling module 536, may determine if and when an RX event is scheduled to occur on the first transceiver chain TRX1 based on an amount of buffered data (e.g., stored in the TRX1 packet queues 532) to be transmitted via the first transceiver chain TRX1. For example, as described above with respect to FIGS. 3A-3B and 4A-4B, an RX event (e.g., corresponding with reception of an ACK message) may be expected immediately following the transmission of a data frame.

The wireless device 500 transmits a second data signal via the second transceiver chain TRX2 based at least in part on the determined RX event (720). The second data signal may be transmitted over a different wireless channel (e.g., CH_B) than the first data signal. For example, the second transceiver chain TRX2 may transmit the second data signal until the time at which the RX event is scheduled to occur on the first transceiver chain TRX1. The processor 520 may execute the TX modification module 538 to modify transmit operations on the second transceiver chain TRX2 during a scheduled RX event on the first transceiver chain TRX1.

The wireless device 500 then suspends transmission of the second data signal when the first transceiver chain TRX1 is to receive the first data signal (730). For example, at the time of the scheduled RX event, the second transceiver chain TRX2 suspends transmission of the second data signal (e.g., which may include suspending transmit operations by the second transceiver chain TRX2) to prevent self-interference from affecting the reception of an incoming data signal received via the first transceiver chain TRX1. For some embodiments, the processor 520, in executing the TX modification module 538, may terminate the second data signal prior to the scheduled RX event on the first transceiver chain TRX1. For other embodiments, the processor 520, in executing the TX modification module 538, may prevent transmission of a portion of the second data signal that overlaps with the RX event on the first transceiver chain TRX1.

Figure 8:
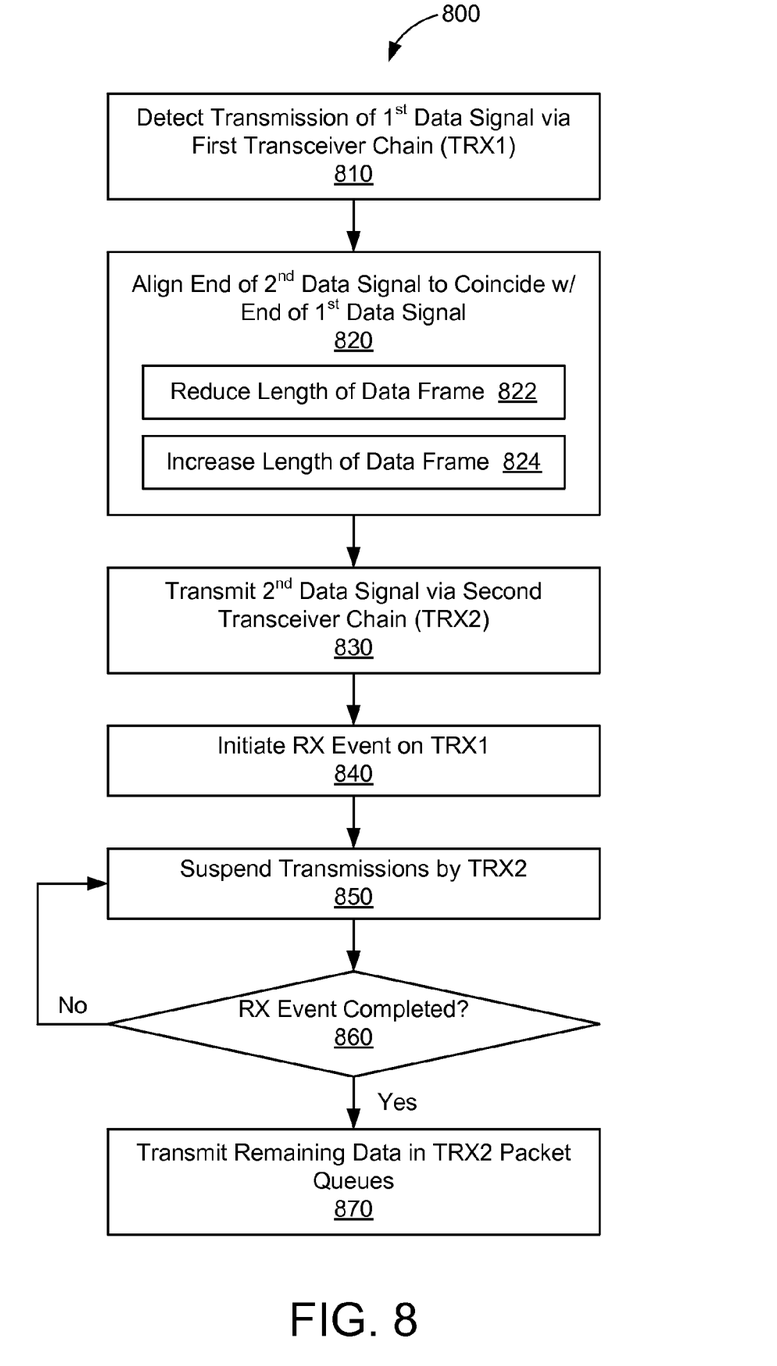
FIG. 8 shows a flowchart depicting an example modified TX operation whereby the transmission of an outgoing data signal is terminated prior to receiving an incoming data signal.

FIG. 8 shows a flowchart depicting an example modified TX operation 800 whereby the transmission of an outgoing data signal is suspended prior to receiving an incoming data signal. With reference, for example, to FIG. 5, the operation 800 may be performed by the wireless device 500 to suspend a transmission of outgoing data signals by the transceiver chains (e.g., TRX1 and/or TRX2) of the transceiver 510 when at least one other transceiver chain is scheduled to receive incoming data signals via the same frequency band. In example embodiments, the modified TX operation 800 may be triggered each time the wireless device 500 has buffered data to send via at least one of the transceiver chains TRX1 and/or TRX2 (e.g., and prior to transmitting the buffered data).

The wireless device 500 detects the transmission of a first data signal via the first transceiver chain TRX1 (810). For example, the processor 520, in executing the RX scheduling module 536, may detect an ongoing data transmission via the first transceiver chain TRX1 when a TX event is initiated on the second transceiver chain TRX2. In example embodiments, the RX scheduling module 536, as executed by the processor 520, may determine an amount of buffered data (e.g., stored in the TRX1 packet queues 532) remaining to be transmitted via the first transceiver chain TRX1 when the TX event is initiated on the second transceiver chain TRX2. As described above, an RX event (e.g., the reception of an ACK message) may be anticipated on the first transceiver chain TRX1 immediately following the transmission of the first data signal.

The wireless device 500 may then align the end of a second data signal, awaiting transmission via the second transceiver chain TRX2, with the end of the first data signal being transmitted via the first transceiver chain TRX1 (820). For example, the processor 520 may execute the TX alignment sub-module 540 to configure and/or adjust the length of an outgoing data frame awaiting transmission via the second transceiver chain TRX2 such that the second data signal terminates prior to initiation of the scheduled RX event on the first transceiver chain TRX1.

If the amount of buffered data awaiting transmission via the second transceiver chain TRX2 is greater than the amount of buffered data remaining to be transmitted via the first transceiver chain TRX1, the processor 520, in executing the TX alignment sub-module 540, may reduce the length of the data frame scheduled for transmission via the second transceiver chain TRX2 (822). For example, as described above with respect to FIG. 3A, the wireless device 500 may subtract one or more PDUs that were otherwise scheduled to be transmitted via the second transceiver chain TRX2 in a single data frame so that the end of the data frame transmitted via the second transceiver TRX2 (e.g., data frame B) is aligned with the end of the data frame transmitted via the first transceiver chain TRX1 (e.g., data frame A). The remaining PDUs may be assembled into a separate data frame (e.g., data frame C) to be transmitted after the RX event is completed.

If the amount of buffered data awaiting transmission via the second transceiver chain TRX2 is less than the amount of buffered data remaining to be transmitted via the first transceiver chain TRX1, the processor 520, in executing the TX alignment sub-module 540, may increase the length of the data frame scheduled for transmission via the second transceiver chain TRX2 (824). For example, as described above with respect to FIG. 3B, the wireless device 500 may add one or more PDUs to the data frame scheduled to be transmitted via the second transceiver chain TRX2 (e.g., data frame B) so that the end of the data frame transmitted via the second transceiver chain TRX2 is aligned with the end of the data frame transmitted via the first transceiver chain TRX1 (e.g., data frame A). For some embodiments, the additional PDUs may be null PDUs. For other embodiments, the additional PDUs may contain data to be transmitted in separate data frames.

The wireless device 500 may then transmit the second data signal via the second transceiver chain TRX2 (830). When the RX event is initiated on the first transceiver chain TRX1 (840), the wireless device suspends transmissions by the second transceiver chain TRX2 (850). For example, the wireless device may ensure that the second transceiver chain TRX2 does not transmit any outgoing data signals (e.g., in addition to the second data signal) that would interfere with the RX event on the first transceiver chain TRX1. For some embodiments, an RX event may be initiated on the second transceiver chain TRX2 concurrently with the RX event on the first transceiver chain TRX1. For example, since the end of the second data signal is aligned with the end of the first data signal, the second transceiver chain TRX2 may expect to receive an ACK message via channel CH_B (e.g., in response to the second data signal) at substantially the same time the first transceiver chain TRX1 expects to receive an ACK message via channel CH_A (e.g., in response to the first data signal).

The wireless device 500 may refrain from transmitting data signals via the second transceiver chain TRX2 until the RX event is completed on the first transceiver chain TRX1 (860). In some embodiments, the RX event may last a predetermined duration (e.g., corresponding with the transmission of a fixed-size data frame, management frame, and/or control frame). For other embodiments, the processor 520 may monitor the first transceiver chain TRX1 to determine when the RX event is over (e.g., when the first transceiver chain TRX1 becomes inactive and/or stops receiving incoming data signals).

Once the RX event is completed (as tested at 860), the wireless device 500 may proceed by transmitting any remaining data stored in the TRX2 packet queues 534 (870). For example, the remaining data may include data that was subtracted from the data frame originally scheduled to be transmitted via the second transceiver chain TRX2 (e.g., at 822). Alternatively, and/or in addition, the remaining data may include data scheduled to be transmitted via the second transceiver chain TRX2 in subsequent data frames.

Figure 9:
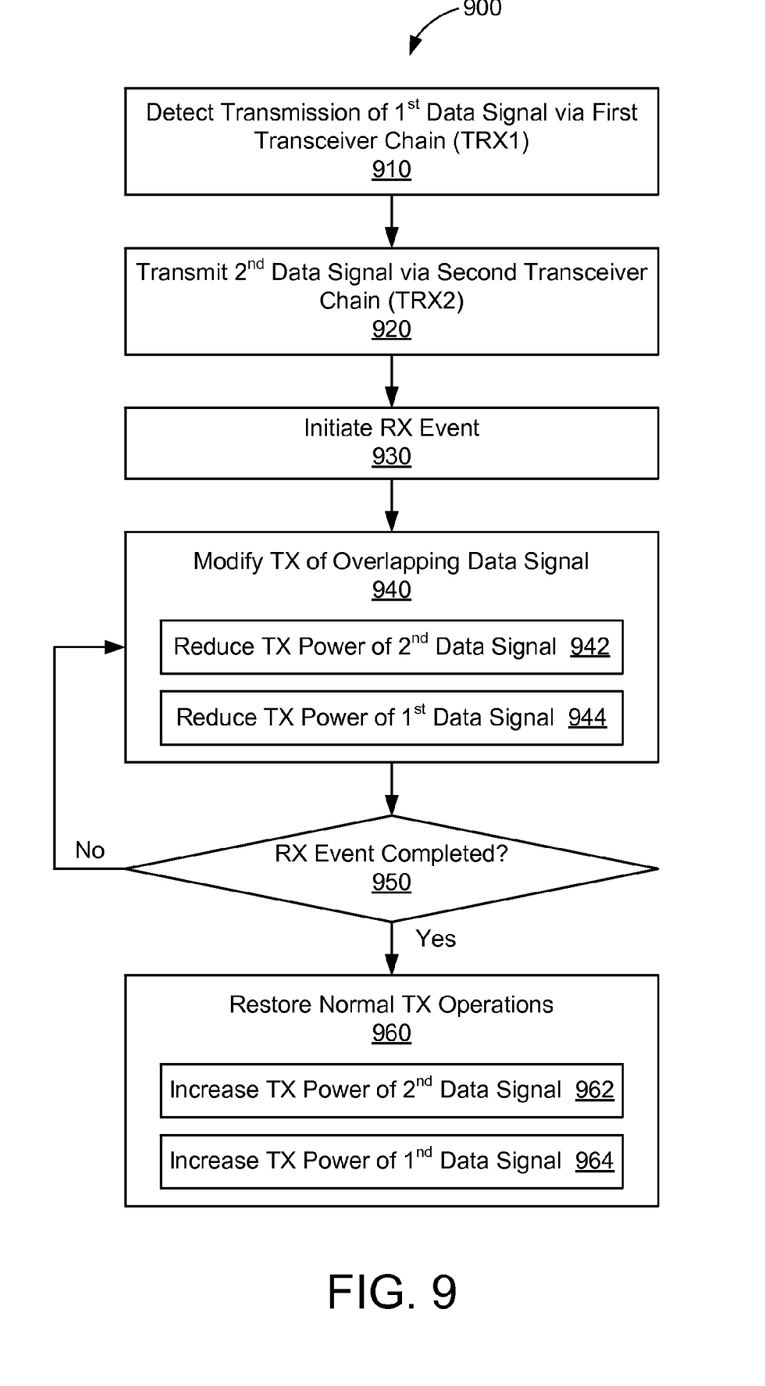
FIG. 9 shows a flowchart depicting an example modified TX operation whereby transmit properties of an outgoing data signal are adjusted during portions that overlap with an incoming data signal.

FIG. 9 shows a flowchart depicting an example modified TX operation 900 whereby transmit properties of an outgoing data signal are adjusted during portions that overlap with an incoming data signal. With reference, for example, to FIG. 5, the operation 900 may be performed by the wireless device 500 to prevent transmission, and/or reduce a transmit power, of at least a portion of an outgoing data signal when at least one other transceiver chain is scheduled to receive incoming data signals via the same frequency band. In example embodiments, the modified TX operation 900 may be triggered each time the wireless device 500 has buffered data to send via at least one of the transceiver chains TRX1 and/or TRX2 (e.g., and prior to transmitting the buffered data).

The wireless device 500 detects the transmission of a first data signal via the first transceiver chain TRX1 (910). For example, the processor 520, in executing the RX scheduling module 536, may detect an ongoing data transmission via the first transceiver chain TRX1 when a TX event is initiated on the second transceiver chain TRX2. In example embodiments, the RX scheduling module 536, as executed by the processor 520, may determine an amount of buffered data (e.g., stored in the TRX1 packet queues 532) remaining to be transmitted via the first transceiver chain TRX1 when the TX event is initiated on the second transceiver chain TRX2. As described above, an RX event (e.g., the reception of an ACK message) may be anticipated on the first transceiver chain TRX1 immediately following the transmission of the first data signal.

The wireless device 500 transmits a second data signal via the second transceiver chain TRX2 (920), until an RX event is initiated on at least one of the transceiver chains TRX1 and/or TRX2 (930). Upon initiation of the RX event (e.g., at 930), the wireless device 500 may adjust the transmit properties of (e.g., an overlapping portion of) a data signal being transmitted concurrently with the RX event (940). For example, the processor 520 may execute the TX overlap sub-module 542 to prevent a transmission and/or reduce a transmit power of one or more outgoing PDUs being transmitted via the second transceiver chain TRX2 that overlap with the RX event on the first transceiver chain TRX1.

If the RX event occurs on the first transceiver chain TRX1, the processor 520, in executing the TX overlap sub-module 542, may reduce a transmit power, and/or prevent transmission, of one or more overlapping PDUs of the second data signal (942). For example, as described above with respect to FIG. 4A, the second data signal may be longer than the remainder of the first data signal. Accordingly, the wireless device 500 may reduce a transmit power (e.g., below a threshold level and/or to zero) of the second transceiver chain TRX2 when the RX event is initiated on the first transceiver chain TRX1 (e.g., at time $t_1$). This allows the second transceiver chain TRX2 to effectively "continue" its transmission of the second data signal during the RX event, while mitigating self-interference that may be attributed to the ACK message received via the first transceiver chain TRX1 (e.g., at time $t_4$).

If the RX event occurs on the second transceiver chain TRX2, the processor 520, in executing the TX overlap sub-module 542, may reduce a transmit power, and/or prevent transmission, of one or more overlapping PDUs of the first data signal (944). For example, as described above with respect to FIG. 4B, the second data signal may be shorter in length than the remainder of the first data signal. Accordingly, the wireless device the wireless device 500 may reduce a transmit power (e.g., below a threshold level and/or to zero) of the first transceiver chain TRX1 when the RX event is initiated on the second transceiver chain TRX2 (e.g., at time t1). This allows the second transceiver chain TRX2 to receive the ACK message (e.g., at time $t_4$) without noticeable interference from the first transceiver chain TRX1.

Transceiver chains that are transmitting outgoing data signals may continue operating with reduced transmit power until the RX event is completed (950). In some embodiments, the RX event may last a predetermined duration (e.g., corresponding with the transmission of a fixed-size data frame, management frame, and/or control frame). For other embodiments, the processor 520 may monitor the transceiver chains TRX1 and/or TRX2 to determine when the RX event is over (e.g., when a corresponding transceiver chain becomes inactive and/or stop receiving incoming data signals).

Once the RX event is completed (as tested at 950), the wireless device 500 may then restore normal transmit operations of the transceiver chains TRX1 and/or TRX2 (960). For example, because there are no more overlapping PDUs, the processor 520, in executing the overlap sub-module 542, may restore the transmit power of any outgoing data signals still being transmitted via the transceiver chains TRX1 and/or TRX2. For example, if the RX event occurred on the first transceiver chain TRX1, the wireless device 500 may now increase (e.g., restore) the transmit power, and/or resume transmission, of the second data signal transmitted via the second transceiver chain TRX2 (962). If the RX event occurred on the second transceiver chain TRX2, the wireless device 500 may now increase (e.g., restore) the transmit power, and/or resume transmission, of the first data signal transmitted via the first transceiver chain TRX1 (964).

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the disclosure.

The methods, sequences or algorithms described in connection with the aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor.

In the foregoing specification, embodiments have been described with reference to specific examples. It will, however, be evident that various modifications and changes may be made thereto without departing from the broader scope of the disclosure as set forth in the appended claims. For example, the method steps depicted in the flow charts of FIGS. 7 and 8 may be performed in other suitable orders, multiple steps may be combined into a single step, and/or some steps may be omitted (or further steps included). The specification and drawings are, accordingly, to be regarded in an illustrative sense rather than a restrictive sense.

What is claimed is:

1. A method of wireless communications, the method implemented by a wireless device and comprising:
   determining a time at which a first transceiver chain of the wireless device is to receive a first data signal;
   transmitting a second data signal via a second transceiver chain of the wireless device based at least in part on the determination; and
   suspending the transmission of the second data signal, based at least in part on the determined time that the first transceiver chain is to receive the first data signal, by adding to or subtracting from a data frame corresponding to the second data signal one or more protocol data units (PDUs) so that transmission of the second data signal is suspended prior to the time at which the first transceiver is to receive the first data signal.

2. The method of claim 1, further comprising:
   resuming the transmission of the second data signal via the second transceiver chain after completing reception of the first data signal.

3. The method of claim 1, wherein adding the one or more PDUs to the data frame corresponding to the second data signal comprises:
   determining a desired length for the data frame based at least in part on the time at which the first transceiver chain is to receive the first data signal;
   generating one or more null PDUs based on a difference between a length of the data frame and the desired length; and
   adding the one or more null PDUs to the data frame to expand the length of the data frame to the desired length.

4. The method of claim 1, wherein suspending the transmission of the second data signal comprises:
   preventing a transmission of one or more PDUs of the second data signal that overlap with the first data signal.

5. The method of claim 4, wherein preventing the transmission of the one or more PDUs of the second data signal comprises:
   adjusting a gain of a power amplifier, in the second transceiver chain, used to transmit the second data signal.

6. The method of claim 1, further comprising:
   transmitting a number of PDUs corresponding to the second data signal, via the second transceiver chain, after reception of the first data signal by the first transceiver chain.

7. A wireless communications device, comprising:
   a first transceiver chain;
   a second transceiver chain;
   one or more processors; and
   a memory storing instructions that, when executed by the one or more processors, cause the wireless communications device to:
      determine a time at which the first transceiver chain is to receive a first data signal;
      transmit a second data signal via a second transceiver chain of the wireless communications device based at least in part on the determination; and
      suspend the transmission of the second data signal, based at least in part on the determined time that the first transceiver chain is to receive the first data signal, by adding to or subtracting from a data frame corresponding to the second data signal one or more protocol data units (PDUs) so that transmission of the second data signal is suspended prior to the time at which the first transceiver is to receive the first data signal.

8. The wireless communications device of claim 7, wherein execution of the instructions further causes the wireless communications device to:
   resume the transmission of the second data signal via the second transceiver chain after completing reception of the first data signal.

9. The wireless communications device of claim 7, wherein execution of the instructions for suspending the transmission of the second data signal causes the wireless communications device to:
   prevent a transmission of one or more PDUs of the second data signal that overlap with the first data signal.

10. The wireless communications device of claim 9, wherein execution of the instructions for preventing the transmission of one or more PDUs of the second data signal causes the wireless communications device to:
    adjust a gain of a power amplifier, in the second transceiver chain, used to transmit the second data signal.

11. The wireless communications device of claim 7, wherein execution of the instructions further causes the wireless communications device to transmit a number of PDUs corresponding to the second data signal, via the second transceiver chain, after reception of the first data signal by the first transceiver chain.

12. The wireless communications device of claim 7, wherein execution of the instructions for adding the one or more PDUs to the data frame corresponding to the second data signal further cause the wireless communications device to:
   determine a desired length for the data frame based at least in part on the time at which the first transceiver chain is to receive the first data signal;
   generate one or more null PDUs based on a difference between a length of the data frame and the desired length; and
   add the one or more null PDUs to the data frame to expand the length of the data frame to the desired length.

13. A non-transitory computer-readable storage medium containing program instructions that, when executed by a processor of a wireless communications device, cause the wireless communications device to:
   determine a time at which a first transceiver chain of the wireless communications device is to receive a first data signal;
   transmit a second data signal via a second transceiver chain of the wireless communications device based at least in part on the determination; and
   suspend the transmission of the second data signal, based at least in part on the determined time that the first transceiver chain is to receive the first data signal, by adding to or subtracting from a data frame corresponding to the second data signal one or more protocol data units (PDUs) so that transmission of the second data signal is suspended prior to the time at which the first transceiver is to receive the first data signal.

14. The non-transitory computer-readable storage medium of claim 13, wherein execution of the instructions for suspending the transmission of the second data signal causes the wireless communications device to:
   prevent a transmission of one or more protocol data units (PDUs) of the second data signal that overlap with the first data signal.

15. The non-transitory computer-readable storage medium of claim 13, wherein execution of the instructions further causes the wireless communications device to transmit a third data signal via the first transceiver chain of the wireless communications device prior to the determined time, wherein the transmission of the third data signal terminates at a time coinciding with the suspension of the transmission of the second data signal.

16. The non-transitory computer-readable storage medium of claim 13, wherein execution of the instructions further causes the wireless communications device to resume the transmission of the second data signal via the second transceiver chain after completing reception of the first data signal.

17. The non-transitory computer-readable storage medium of claim 13, wherein execution of the instructions for adding the one or more PDUs to the data frame corresponding to the second data signal further cause the wireless communications device to:
   determine a desired length for the data frame based at least in part on the time at which the first transceiver chain is to receive the first data signal;
   generate one or more null PDUs based on a difference between a length of the data frame and the desired length; and
   add the one or more null PDUs to the data frame to expand the length of the data frame to the desired length.

* * * * *